United States Patent [19]
Nilsson

[11] 3,765,381
[45] Oct. 16, 1973

[54] METHODS OF INTRODUCING FUEL INTO AN INTERNAL COMBUSTION ENGINE AND DEVICES THEREFOR

[76] Inventor: Alex Gustav Allan Nilsson, Ostra Farmvagen 34 B, Malmo, Sweden

[22] Filed: Sept. 8, 1971

[21] Appl. No.: 178,602

[30] Foreign Application Priority Data
Sept. 10, 1970 Sweden............................ 12313/70

[52] U.S. Cl. ......... 123/33 VC, 123/33 D, 123/32 K
[51] Int. Cl. ......................... F02m 67/00, F02b 3/00
[58] Field of Search ............. 123/32 B, 32 C, 32 D, 123/32 K, 32 ST, 33 VC, 33 D

[56] References Cited
UNITED STATES PATENTS
| | | | |
|---|---|---|---|
| 2,419,096 | 4/1947 | Stickney.......................... | 123/33 VC |
| 2,503,186 | 4/1950 | Ziegler............................. | 123/33 D |
| 3,507,261 | 4/1970 | Myers et al. .................... | 123/32 ST |
| 3,580,231 | 5/1971 | Brodbury.......................... | 123/32 K |

FOREIGN PATENTS OR APPLICATIONS
| | | | |
|---|---|---|---|
| 2,575 | 2/1908 | Great Britain ................ | 123/33 VC |
| 14,845 | 9/1913 | Great Britain ................ | 123/33 VC |

Primary Examiner—Laurence M. Goodridge
Assistant Examiner—Cort Flint
Attorney—Ralph E. Bucknam et al.

[57] ABSTRACT

The invention relates to a method permitting operation of internal combustion engines without using conventional ignition systems and without requiring such heavy fuel feed pumps as are necessary in diesel engines, or the complicated injection means required in engines with direct fuel injection against high compression pressure in the cylinders. The present invention makes use of fuel chambers communicating with the cylinders through valve-controlled ports which can be opened and closed in the same way as conventional intake and exhaust valve ports in dependence on the rotation of the crankshaft and which are opened to the combustion chambers in the engine cylinders at a suitable point of time within a period immediately before and after completion of a compression stroke and are closed after initiation of a suction stroke for evacuating the fuel chambers for reducing the pressure and for a certain cooling of the valves.

10 Claims, 4 Drawing Figures

METHODS OF INTRODUCING FUEL INTO AN INTERNAL COMBUSTION ENGINE AND DEVICES THEREFOR

The present invention relates to a method of introducing fuel into the combustion chamber of the cylinder or each of the cylinders of an internal combustion engine, in which air for the combustion is compressed during the working cycle of the engine to reach a high pressure during a compression stroke prior to each power stroke, said fuel being introduced into the combustion chamber at or near the end of the compression stroke from a fuel chamber separated from the combustion chamber by means of a sluice valve.

It is already known to arrange auxiliary chambers in communication with the combustion chambers of combustion engines through a valve which is opened at the end of the compression stroke and closed at the end of the power stroke or at an earlier point of time. The purpose of this is to allow the air compressed to high pressure in the respective cylinder to rush into the auxiliary chamber in order to ignite the fuel and transport the fuel from the auxiliary chamber to the cylinder. Previously known devices and their mode of operation have, however, serious drawbacks making them impossible for practical use. A serious obstacle is, for example, the risk of overheating the sluice valve which must remain open during a substantial part of the power stroke and therefore is exposed to strong heating during the combustion stage. Another drawback is that feeding of fuel into the auxiliary chamber is made more difficult due to pressure rising in the auxiliary chamber when the fuel comes into contact with the hot walls of the auxiliary chamber. Attempts have been made to overcome this inconvenience by placing the auxiliary chamber at a long distance from the cylinder but this solution has proved impossible in practice due to the fact that the fuel will have to travel far too long to reach the cylinder chamber in modern engines operating at a high rpm. The invention has for its object to solve these problems in order thereby to permit the operation of combustion engines without requiring any conventional complicated ignition systems which are used in carburettor-fed engines, or the heavy fuel feed pumps in diesel engines.

This object has now been realized through the method of this invention wherein for each working cycle of the engine a fuel portion adequate to one power stroke is introduced from a source of fuel into a comparatively small, closed space near the combustion chamber in the cylinder or each cylinder, communication is established between this space and the respective combustion chamber at the end of the compression stroke for the cylinder in question to admit compressed air from the cylinder into said space for mixing with the fuel and for ejecting this to the combustion chamber under such conditions that the fuel/air mixture formed is ignited at the same time, and the pressure in said space is reduced before the next fuel portion is fed.

According to a further development of the invention, said space may be kept open to the cylinder chamber via the sluice valve during at least the first part of the suction stroke in the cylinder, in order to bring about a pressure drop before each feeding of a new fuel portion. Another improvement can be made by arranging the air flow passages so as to provide during the suction stroke a flow of air around the sluice valve for cooling this valve.

For carrying the invention into effect, the invention also comprises a combustion engine which may have one or more cylinders and conventional air intake and exhaust valves for each cylinder. The engine according to the invention is equipped with a fuel chamber arranged in close connection with the combustion chamber in the cylinder or each cylinder, said fuel chamber being connected to a source of fuel and adapted, before the end of each compression stroke in the cylinder, to receive from the fuel source a fuel portion adequate to the power stroke in the cylinder, and to be connected to the combustion chamber in the cylinder through a communication which is adapted to be closed by the sluice valve and to be opened for connecting the fuel chamber to the combustion chamber at or near the end of each compression stroke to admit hot compressed air from the combustion chamber to the fuel in the fuel chamber under such conditions that the fuel portion in the fuel chamber will be mixed with the compressed hot air under such pressure and temperature conditions that the mixture will be ignited and ejected into the combustion chamber for bringing about the power stroke in the cylinder, said engine further comprising means for decreasing the pressure in the fuel chamber before each new feed of a fuel portion into this chamber.

According to a preferred embodiment the pressure decreasing means comprises a valve means adapted to bring the fuel chamber into communication with a point of the air intake and exhaust system of the engine where a comparatively low pressure prevails during at least part of the suction stroke. This valve means may consist of or comprise the sluice valve and is adapted to be regulated by a valve control mechanism driven by the camshaft, and said point, where a comparatively low pressure prevails, may be the cylinder chamber during the first part of the suction stroke.

The invention makes it possible to mix, for example, inflammable fuel into high-compressed air in the engine cylinders in that the fuel is fed under the most favourable pressure conditions into the fuel chambers which communicate with the cylinders through valve controlled ports which can be opened and closed in the same manner as the conventional intake and exhaust valve ports of the engine in dependence upon the rotation of the camshaft, said fuel chambers being opened to the combustion chambers in the respective engine cylinders at an optimum point of time within the period immediately before and after the compression stroke is completed. The air having been compressed to high compression in the respective combustion chamber rushes into the respective fuel chamber and is mixed with fuel contained therein. The fuel is gasified and the mixture is ignited while rushing into the combustion chamber under the action of strong turbulence which arises when the gas particles are ignited when coming into contact with the heated air. Thus, a spontaneous ignition is effected as a result of temperature and pressure and it should be noticed that the air in the respective cylinder can be compressed to a very high pressure even when inlammable high- or low-octane fuels are used and substitute therefor: Preignition of the fuel is avoided because the fuel is not exposed to the compression pressure until it is mixed with air, which mixing takes place when the valve-controlled fuel port is opened exactly at the right moment of ignition Despite a high compression pressure, there is no need for using those heavy pressure pumps which are necessary in conventional diesel engines in which the feed of fuel is effected against the high pressure in the combustion chambers, because the fuel is first fed into a fuel chamber in which the pressure is low. As the fuel chambers are positioned close to the respective combustion chambers the flow passages become short and as the pressure in the fuel chambers is decreased before the feeding of the fuel portions the fuel chambers may have a comparatively small volume, which makes it possible to operate the engine at a relatively high rpm.

The invention will be described more fully below with reference to the accompanying drawings, in which.

Figure 1:
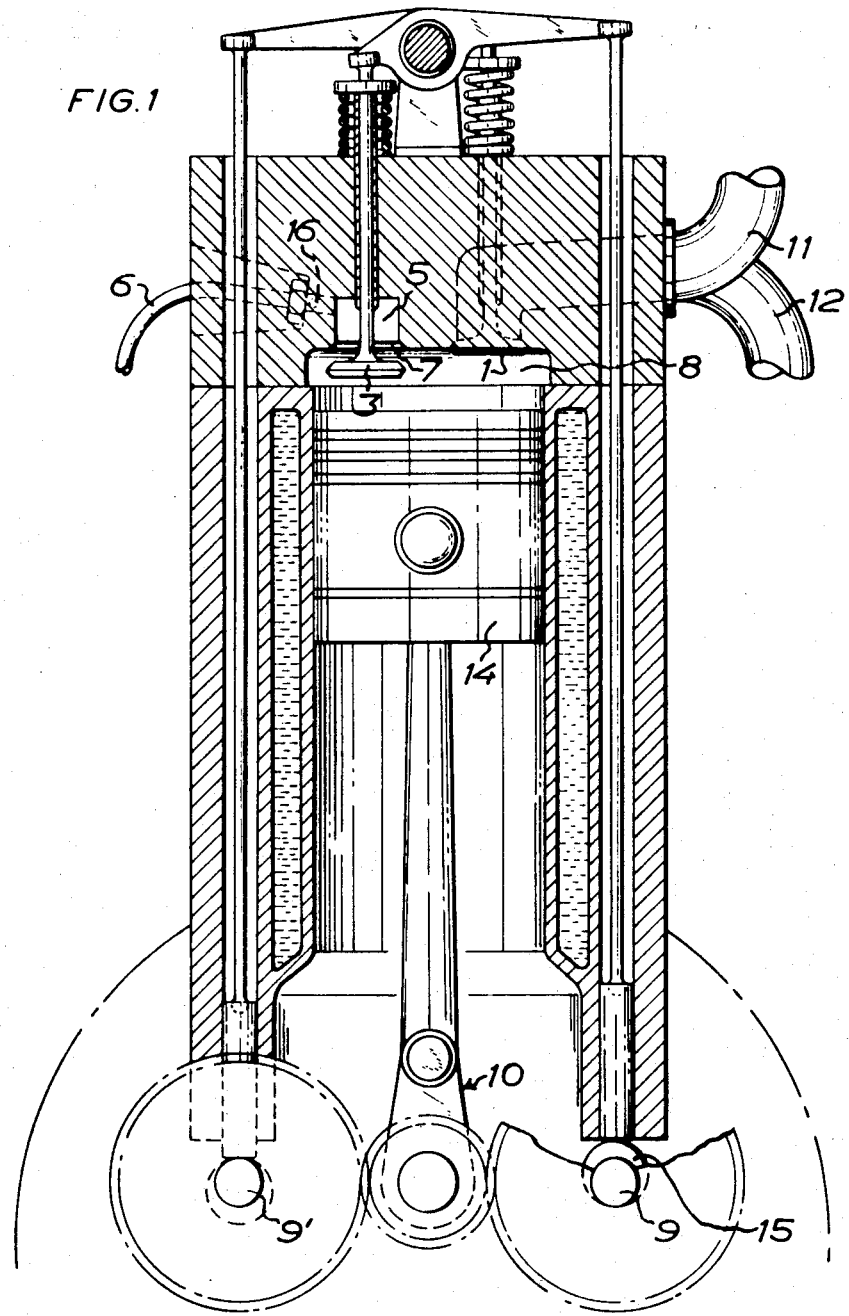
FIG. 1 is a schematic vertical cross sectional view of part of a combustion engine according to the invention, equipped with two crankshaft driven camshafts for the valve control.

The engine as shown in FIG. 1 is provided in a generally conventional manner with an inlet valve 1 and an outlet valve (concealed in FIG. 1) for each cylinder but in accordance with the present invention it is also equipped with a third valve 3 adapted to open and close a communication between a fuel chamber 5 provided in the cylinder head, said chamber being adapted to serve as a sluice for the transfer of fuel from a fuel source under pressure and for this purpose said chamber is connected to said fuel source (not shown) through a pipe 6. The additional valve 3, which thus serves as a sluice valve, is substantially of the same design and has substantially the same mechanical mode of function as the conventional inlet valve 1, and the sluice valve port 7 between the fuel chamber 5 and the combustion chamber 8 in the cylinder is also of the same design as the conventional inlet port of the embodiment shown in FIG. 1. The fuel feed or sluice valve 3 is regulated by means of a common valve operating mechanism which includes one 9 of the two camshafts 9, 9' of the engine which are driven in a conventional manner by means of the crankshaft 10.

Figure 3:
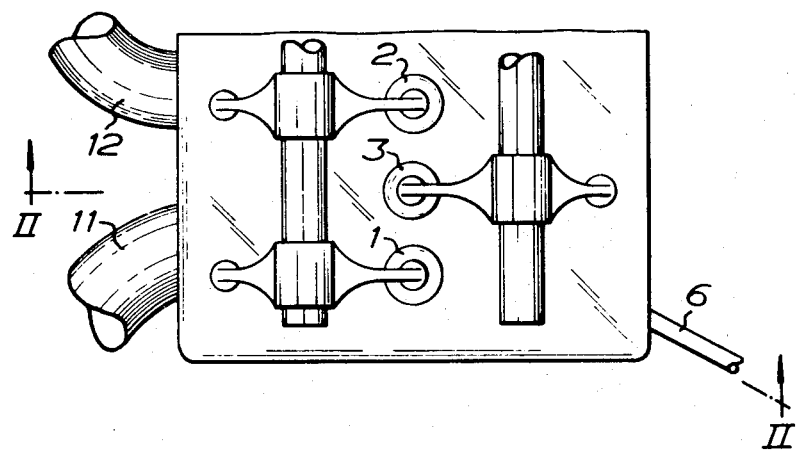
FIG. 3 is a top plan view of part of the engine of FIG. 2 with a top cover removed.

The inlet valve 1 is adapted to admit air from the air intake pipe 11 and the outlet valve (2 in FIG. 3) is adapted to let out the exhaust gases to the exhaust pipe 12 in a conventional manner.

In FIG. 1 the engine piston 14 is shown at its upper turning-point position on its way downwards, just as the sluice valve 3 has opened. High-compressed air from the combustion chamber 8 and gas, which has been produced from the fuel in the fuel chamber 5 by heating from the cylinder head, are mixed with each other in the combustion chamber 8 and in the fuel chamber 5 under strong turbulence produced by the pressure difference and the pressure equalization between the fuel chamber 5 and the combustion chamber 8, and by contact with the hot high-compressed air in the combustion chamber the fuel is ignited in a very short time throughout the gaseous mass.

In low-octane fuels the ignition perhaps tends to be carried through too rapidly but this can be prevented by dimensioning the valve port diameter with respect to the type of fuel concerned and the ignition speed desired. Another possible way is to control the movement of the valve 3 so that it opens and closes the sluice valve port 7 according to an optimum movement pattern which can be defined by the form of the corresponding cam 15 on the camshaft 9. By comparatively easily realized modifications the invention can thus be adapted to suit most types of fuel from common high-octane fuels used for high-compressed carburettor-fed engines, or diesel oil used in common diesel engines, to low-octane fuel, such as engine kerosene or illuminating kerosene, or liquified petroleum gas or other gaseous fuel.

To prevent the pressure in the fuel chamber 5 from spreading via the combustion chamber 8 to the fuel pipe 6 when the valve 3 is open, a non-return valve 16 is arranged at the inlet of the fuel pipe into the fuel chamber 5. The feeding of the fuel portions into the fuel chambers 5 of the engine takes place intermittently during a very short time and in operation no significant back-pressure will arise due to gasification of fuel in the fuel chamber heated by the engine. Thus, the supply of fuel to the fuel chambers 5 can be effected pulsatingly at a comparatively low pressure by means of a simple pump and, for instance, an electronically controlled injection means in such a way that the pulse length exactly defines the quantity of fuel injected per pulse and so that this quantity will be in proper relation to the engine load. The fuel valves 3 can be sealed in substantially the same way as conventional inlet valves or according to other known sealing methods and the cooling of the valve 3 which in the embodiment shown is exposed to high heat from the combustion chamber, can likewise be carried out in a conventional manner, for instance in accordance with known principles for the cooling of aircraft engine valves. The third valve will be open during the power stroke, during the exhaust stroke and during a substantial part of the suction stroke and is not entirely closed until the suction stroke has been completed (see the form of the cam 15 on the camshaft 9), for which reason the valve 3 during the suction stroke or a substantial part thereof is cooled by inflowing cold air. This reduces the heat problem considerably.

From the foregoing it appears that no specific ignition device is required for the engine according to the invention. The compressed heated air in the respective combustion chamber ignites spontaneously the fuel which has been gasified in the fuel chamber 5 by heat produced by the engine. If the engine is water-cooled, the water-cooling may be utilized for controlling the temperature of the chamber 5.

Figure 2:
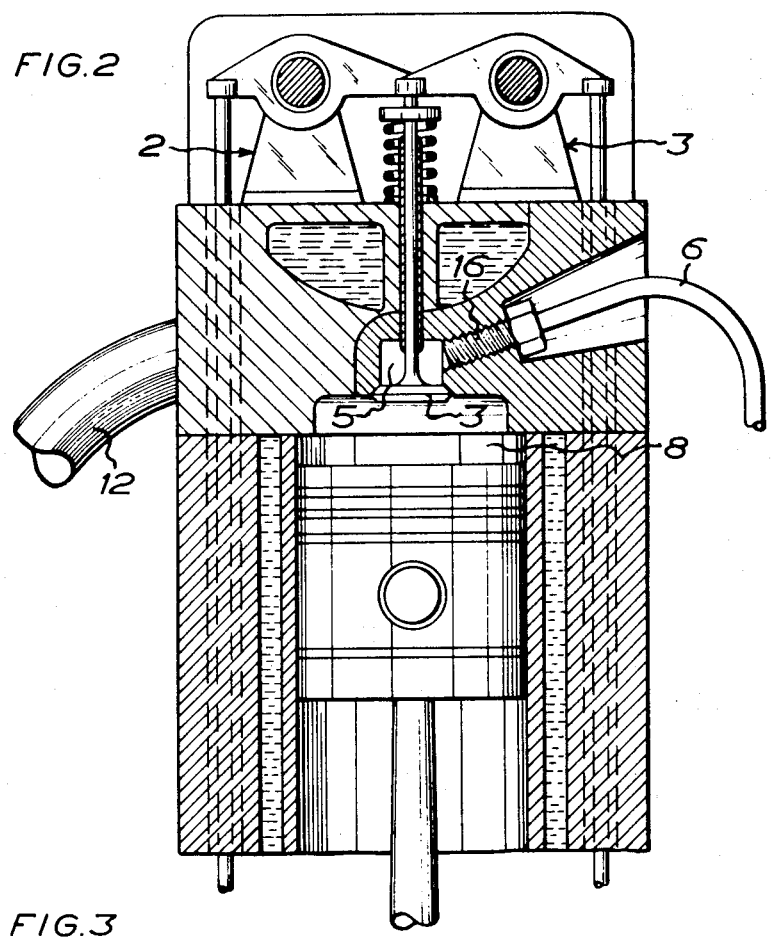
FIG. 2 is a similar view of an engine according to the invention where the valves have been positioned somewhat differently.

The engine shown in FIG. 2 corresponds to the engine of FIG. 1 but shows more clearly how the fuel pipe is introduced into the cylinder head through a passage 20 including the non-return valve 16. According to the embodiment of FIG. 2, the three valves 1, 2 and 3 for a cylinder are aligned in the longitudinal direction of the engine while in FIG. 1 it is assumed that the corresponding valves are positioned on the corners of a triangle.

Various modifications of the valve structures in the illustrated embodiments of the engine according to the invention are of course conceivable within the scope of the invention. The embodiment of the sluice valve 3 is therefore only to be regarded as an example of the invention, as is also the valve control arrangement. A single camshaft with a suitable cam means may of course be used instead of two camshafts.

It should be noticed (see the form of the cam 15 in FIG. 1) that the fuel chambers 5 are kept open during the power strokes in the corresponding cylinder and during the time the exhaust valves are open for the exhaust strokes and that the gas pressure, which is conveyed to the fuel chambers during the power strokes, is thus reduced prior to the next feed of fuel into the respective sluice chamber so that this feeding does not meet any noticeable resistance or, anyway, not any substantial resistance. Of course, another means is conceivable for bringing about a pressure drop in the fuel chambers, and under certain circumstances it is of course also possible considerably to shorten the opening times for the valves 3 either these are controlled by the camshaft via cams or in some other way by the power strokes of the engine.

Figure 4:
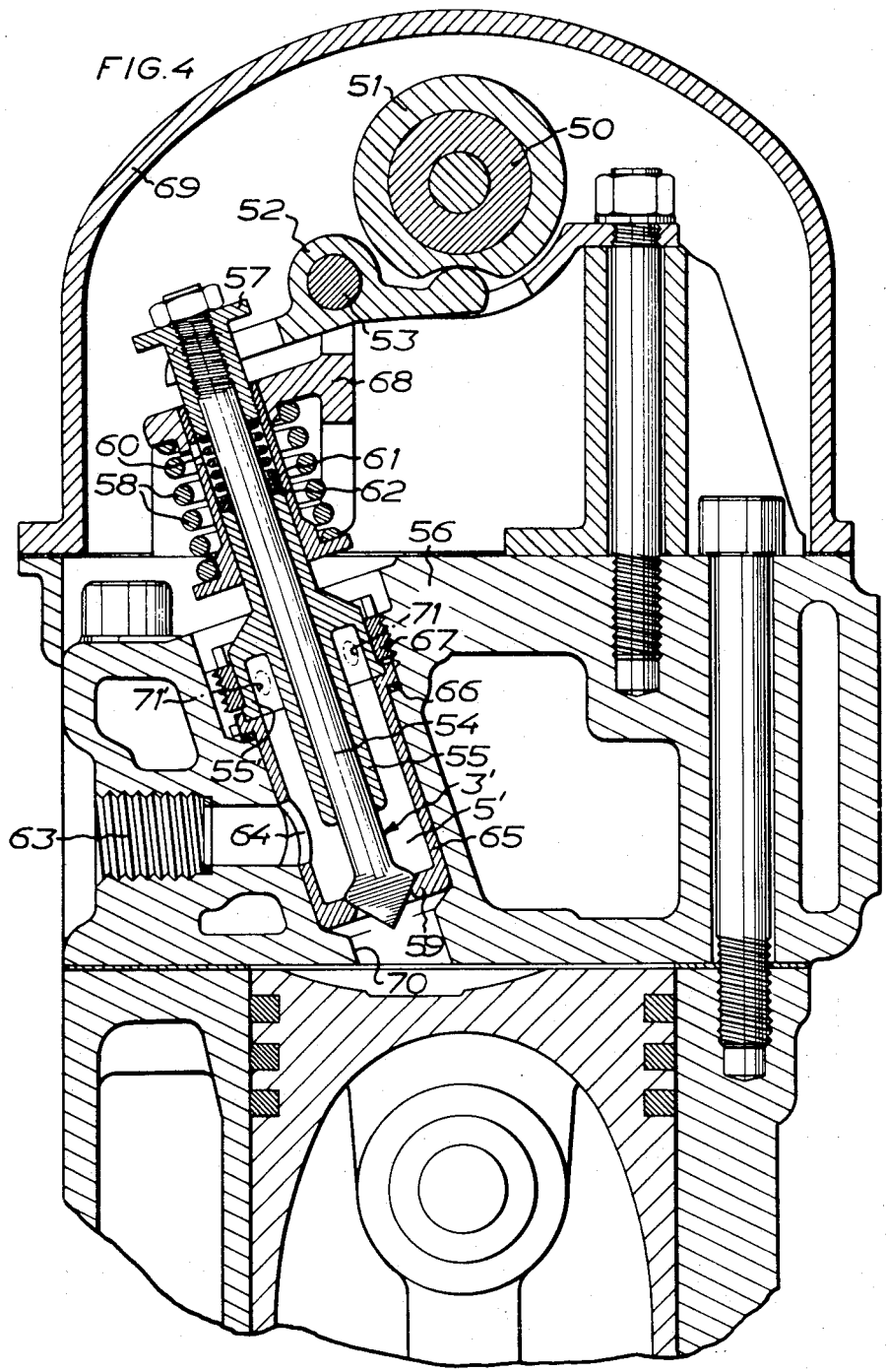
FIG. 4 is a vertical sectional view of the top of a per se known diesel engine as reconstructed according to the invention.

The engine shown in FIG. 4 is a four-cylinder diesel engine of known design reconstructed according to the invention. Originally this engine was provided with a fuel injection nozzle for each cylinder. According to the invention these nozzles are replaced by fuel chambers and sluice valves, and the passages originally arranged for the injection nozzles have been utilized for this purpose. No detailed description of the mode of operation of this engine would seem to be necessary since in principle it agrees with the engine of FIG. 1. For this reason it should only be mentioned that the engine has an overhead camshaft 50 which according to the invention is provided with a divided cam sleeve 51, a rocker 52 on a shaft 53 and s sluice valve 3' with a spindle 54 which is slidably mounted in a sleeve 55 mounted in a bore in the cylinder head 56. The rocker 52 cooperates with the cam sleeve 51 and with a head 57 on the extreme end of the valve spindle 54 which is loaded by a spring 58 for closing the valve member 3' against a valve seat 59 opening into the cylinder chamber. Provided on the spindle between the guide sleeve 55 for the valve spindle and the spindle head 57 is a valve sealing spring 60 which via a plate 61 maintains an O-ring 62 engaged with the extreme end of the guide sleeve 55 around the valve spindle. A fuel conduit (not shown) corresponding to the conduit 6 of FIG. 1 is connected via a bore 63 in the cylinder head and an aperture 64 in an insertion sleeve 65 to the interior of this sleeve which is mounted in a lower part of the bore in which the sleeve 55 and the sluice valve are mounted. The insertion sleeve 65 forms a fuel chamber 5' corresponding to the chamber 5 of FIG. 1, and the lower end of the insertion sleeve 65 forms the valve seat 59 of the sluice valve 3'. The insertion sleeve 65 is closely connected with the cylinder head at 66 and with a projection 55' of the guide sleeve 55, which sleeve is clamped in the bore therefor in the cylinder head by means of a bushing 67 screwed into a threaded part of this bore, which bushing retains the guide sleeve 55 and the insertion sleeve 65 in position. Thus, the bushing 67 and the two sleeves 55, 65 and the entire sluice valve are arranged so as to be rapidly disassembled.

A further modification of the diesel engine shown in FIG. 4 comprises a new bracket 68 for the valve operating mechanism and a changed cover 69.

In the fuel passage 63 a non-return valve may be arranged to prevent reverse flow of fuel.

In the embodiment of FIG. 4, the valve 3' is opened in upward direction for admitting compressed air from the cylinder through the passage 70 and for re-admitting ignited fuel/air mixture through this passage 70 into the cylinder. The passage 70 corresponds to the passage used in the known diesel engine for injecting fuel into the cylinder from an injection nozzle.

In the embodiment of FIG. 4 the volume of the fuel chamber 5' may be readily changed by exchanging the insertion sleeve 65 for adjusting the engine to the working conditions desired.

The fuel supply to the fuel chamber 5' can be regulated by means of a conventional control means for controlling a valve, a pump or the like.

By keeping the valve 3' open during the exhaust stroke and during at least part of the suction stroke, two advantages are obtained, viz., on one hand, cooling of the valve and, on the other hand, evacuation of gases and pressure reduction in the fuel chamber 5'.

It is also possible by means of a valve arrangement to connect the fuel chamber 5' with the intake system of the engine for sucking the air or part of the air into the cylinder at the suction stroke, whereby an efficient cooling is obtained. This valve may be positioned in a passage between the fuel chamber 5' and the suction pipe of the engine and it can be operated by a cam means in cooperation with the camshaft 50. The practical arrangement of such a communication between the chamber 5' and the air intake system of the engine may vary in dependence on the construction of the engine, and this arrangement does not seem to call for any further description to anyone skilled in the art but it may be mentioned that in the construction shown in FIG. 4 such a valve-controlled air introduction passage to the cylinder chamber via the fuel chamber 5' should open into the fuel chamber 5' so that an efficient cooling of the valve will be obtained. The air introduction passage may, for instance, open into the chamber 5' at the upper end of the projection 55' on the guide sleeve 55 through a set of channels 71, 71', as indicated by dot-and-dash lines in FIG. 4.

What I claim and desire to secure by Letters Patent is:

1. In the combustion of fuel in an internal combustion engine which comprises at least one cylinder provided with an air inlet and an exhaust and wherein compressed air ignites the fuel, the gas expands doing work and exhaust gases are removed during the cycle of suction stroke, compression stroke, power stroke and exhaust stroke, a method of introducing fuel into the combustion zone at or near the end of each compression stroke in said cylinder, comprising the steps of introducing fuel into a fuel chamber located in the proximity of the combustion zone in said cylinder, in an amount adequate for one power stroke, when the communication between said combustion zone and said fuel chamber is closed, opening the communication between said fuel chamber and the combustion zone at the end of each compression stroke in said cylinder to admit compressed air from the said cylinder into said fuel chamber, mixing said compressed air with the fuel, ejecting the mixture into the combustion zone, letting the mixture ignite and keeping said communication continuously open up to and during at least the initial portion of the following suction stroke to secure optimal pressure drop prior to introduction of another portion of fuel, while securing evacuation of gases from said fuel chamber and while establishing a current of fresh cooling air in the proximity of the communication between said fuel chamber and said combustion zone.

2. A combustion engine which comprises at least one cylinder, air inlet means and exhaust means, a fuel chamber in the proximity of the combustion chamber in said cylinder, a passageway between said fuel chamber and said combustion chamber, valve means operable to open and close said passageway, a fuel source with means for introducing a fuel portion into said fuel chamber for each power stroke in the cylinder, said valve means being adapted to open and close said passageway only once for each cycle of the engine such that said passageway is opened at the end of each compression stroke and closed before the beginning of each subsequent compression stroke, said fuel introducing means being adapted to introduce fuel into said fuel chamber when the passageway between said fuel chamber and said combustion chamber is closed, said valve means when open being adapted to introduce hot compressed air from the combustion chamber into the fuel chamber and to deliver the fuel/air mixture to the combustion chamber under such pressure and temperature conditions that the mixture self-ignites, said valve means being adapted to be kept continuously open up to and during at least the initial portion of the suction stroke whereby evacuating fuel chamber before each introduction of a new fuel portion.

3. A combustion engine as claimed in claim 2 wherein said valve means comprise a sluice valve.

4. A combustion engine which operates according to the cycle of suction stroke, compression stroke, power stroke and exhaust stroke, comprising at least one cylinder, air inlet means and exhaust means, a fuel chamber arranged in the proximity of the combustion chamber in said cylinder, a fuel source, means for introducing one fuel portion into said fuel chamber for each power stroke in the cylinder, operable to open and close a passageway between said fuel chamber and said combustion chamber, said valve means including a valve controlled by the engine and adapted to operate said valve to open and close said passageway only once for each cycle of the engine such that said passageway is opened at the end of each compression stroke and closed well in time before the beginning of each next compression stroke, said fuel introducing means being adapted to introduce fuel into said fuel chamber when the passageway between said fuel and combustion chambers is closed, whereby the fuel chamber, each time said passageway is opened, receives relatively hot compressed air from the combustion chamber and delivers the fuel portion to the air for producing a fuel/air mixture under such pressure and temperature conditions that the mixture is self-ignited, said valve means being adapted to evacuate said fuel chamber prior to introduction of another fuel portion therein and means for cooling said valve means during at least the beginning of the suction stroke, before said valve means are closed again.

5. The engine according to claim 4 wherein said valve means comprise a sluice valve which is adapted to be closed at a point of time immediately after the lowest pressure has been attained in said combustion chamber and in said fuel chamber.

6. A method as claimed in claim 1 wherein a valve is located in said communication and the intake air for said cylinder is brought into contact with the valve during at least part of the suction stroke in the corresponding cylinder.

7. A combustion engine as claimed in claim 2, wherein the fuel chamber is connected with the fuel source by means of a fuel conduit via a non-return valve adapted to transmit fuel to the fuel chamber and to prevent backward flow of fuel and gas from the fuel chamber towards the fuel source.

8. A combustion engine as claimed in claim 2, wherein the means for reducing the pressure in the fuel chamber each time the chamber has been caused to deliver a fuel portion to the corresponding combustion chamber, includes a means, e.g. a camshaft and a cam, which is driven by the crankshaft of the engine and adapted to bring the fuel chamber into communication with a point for relatively low pressure in the air intake system by keeping a closable communication passage between this system and the fuel chambers open during at least the first part of the suction stroke.

9. A combustion engine as claimed in claim 3, wherein the fuel chamber and the sluice valve arranged for opening and closing the communication between the fuel chamber and the corresponding combustion chamber are adjusted to low-octane fuel, with respect to dimensions and opening time.

10. A combustion engine as claimed in claim 3, wherein the sluice valve is adapted to be closed at a point of time immediately after the lowest pressure has been attained in the corresponding combustion chamber and, consequently, in the fuel chamber.

* * * * *